United States Patent

[11] 3,617,099

[72] Inventor Hiroshi Sugiyama
    Hiratsuka, Japan
[21] Appl. No. 875,160
[22] Filed Nov. 10, 1969
[45] Patented Nov. 2, 1971
[73] Assignee Nissan Motor Company, Limited
    Kanagawa-ku, Yokohama City, Japan
[32] Priorities Nov. 12, 1968
[33]    Japan
[31]    43/82,245;
    Dec. 10, 1968, Japan, No. 43/89,907

[54] ANTISPIN DEVICE FOR MOTOR VEHICLES
    13 Claims, 5 Drawing Figs.
[52] U.S. Cl. .................................................. 303/21 EB,
    303/6 R, 303/13, 303/21 AF, 303/21 F, 317/5,
    324/161
[51] Int. Cl. .................................................. B60t 8/02,
    B60t 13/68

[50] Field of Search ........................................... 180/1, 33;
    188/152, 181; 303/6, 10, 13, 20, 21; 317/5;
    324/160, 161; 340/263

[56]    References Cited
    UNITED STATES PATENTS
3,264,039  8/1966  Cadiov .................... 303/21 BB X
3,264,040  8/1966  Brueder .................... 303/21 BB
3,288,232  11/1966 Shepherd ................. 303/21 BB X
3,400,776  9/1968  Smith ...................... 303/21 BE X
3,463,555  8/1969  Ryskamp .................. 303/21 F Primary Examiner—Milton Buchler
Assistant Examiner—Stephen G. Kunin
Attorney—John Lezdey ABSTRACT: An antispin device for use in combination with a braking system of a motor vehicle, having a spin detector unit and brake-actuating unit. The spin detecting unit detects the difference between the right and left driving wheels and delivers a voltage as soon as the difference exceeds a predetermined level and the brake-actuating unit responds to the voltage to actuate the wheel cylinder of the driving wheel rotating at a higher speed than the other.

INVENTOR
HIROSHI SUGIYAMA
BY John Legally
ATTORNEY

ANTISPIN DEVICE FOR MOTOR VEHICLES

This invention relates to a braking system of a motor vehicle and, more particularly, to an antispin device used in association with the braking system to prevent a driving wheel from spinning.

It is sometimes experienced when driving a motor vehicle on an icy or muddy road that the driving wheel tends to spin or "idle away" without load applied thereto on or over the road surface. This is because the friction between the wheel tire and road surface is critically reduced or lost. Such spinning of the driving wheel is also encountered as the vehicle turns a corner at an elevated speed when the wheel on the inner side of rotation of the vehicle tends to leave or "float" over the road surface. In any event, the wheel thus spinning no longer carries a traction to the vehicle, which, as the consequence, is unable to move in either forward or backward direction.

The spinning of the driving wheel is known to occur as a result of the very action of the differential gearing and, for this reason, a differential gearing of nonslip type having two sets of friction elements and a lock device is usually used in up-to-date motor vehicles. If, in a vehicle having such a nonslip differential gearing, one wheel should encounter a patch of ice or mud that causes it to lose traction temporarily, the wheel is prevented from spinning and from delivering any torque.

The use of the nonslip differential gearing, however, is reflected by a drawback that an undue load is applied to the friction elements whenever the differential gearing is locked, inviting an earlier wear of the friction elements. Another drawback is that each of the lock devices used in the differential gearing should be compatible in respect of size with each differential gearing. Thus, it is necessary to have available a variety of sizes of lock device depending upon the sizes of the differential gearings. This adds up to the fact that the production cost of the differential gearings is significantly increased.

This invention thus contemplates elimination of such a problem and it is an object of the invention to provide a new antispin device to be used with the usual braking system of a motor vehicle.

It is another object of the invention to provide an antispin device adapted to prevent a driving wheel of a motor vehicle from spinning or "idling away" when the vehicle runs on an icy or muddy road or turns a corner at a high speed.

It is still another object of the invention to provide an antispin device which operates to apply brake to a driving wheel as soon as the wheel starts to spin. To accomplish this purpose, the invention proposes to construct the antispin device in such a manner that a braking action is applied to either of the driving wheels, right or left, as soon as the difference between the speeds of the wheels exceeds a predetermined level.

Thus, it is still another object of the invention to provide an antispin device having a spin detector adapted to actuate the brake as soon as the difference between the speeds of the right and left driving wheels exceeds a predetermined level. To assure the antispin device to normally operate even when a failure is involved in the spin detector, failureproof means may be provided, if desired.

It is, therefore, still another object of the invention to provide an antispin device having a spin detector with failureproof means arranged to initiate the antispin device into action even when the spin detector happens to malfunction.

The antispin device accomplishing these objects may be applied to any braking system presently in use but it is preferable to use the device in combination with a pneumatic braking system of usual construction.

Thus, it is still another object of the invention to provide an antispin device adapted to be combined with a pneumatic braking system of known type.

The antispin device according to the invention essentially consists of a pair of brake actuators and a spin detector. Each of the brake actuators is so constructed as to actuate the brake when it receives a voltage of predetermined magnitude. This voltage is supplied by the spin detector which detects the speeds of the right and left driving wheels and delivers a voltage as soon as the difference in these speeds exceeds a predetermined level.

Figure 1:
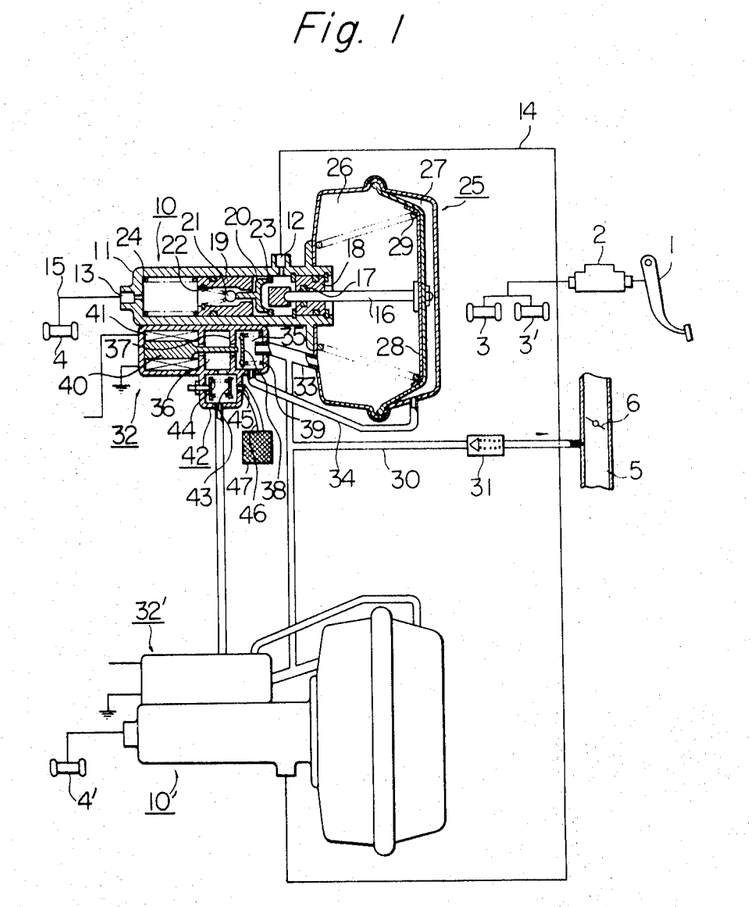
FIG. 1 is a partly sectional schematic view of a preferred example of the brake actuator forming part of the antispin device according to the invention.

The antispin device embodying the invention is illustrated in FIG. 1 as used together with a braking system having a brake pedal 1, master cylinder 2, front wheel cylinders 3 and 3', and rear wheel cylinders 4 and 4'. The wheel cylinders 4 and 4' are for the right and left driving wheels (not shown), respectively. The brake pedal 1 is operatively connected with the master cylinder 2. The hydraulic pressure in the master cylinder 2 is led to the front wheel cylinders 3 and 3' and rear wheel cylinders 4 and 4'.

The hydraulic pressures drawn from the master cylinder 2 to the wheel cylinders 4 and 4' are controlled by two, right and left, brake actuators 10 and 10', respectively, which form part of the antispin device according to the invention. These brake actuators 10 and 10' being essentially identical in construction and operation with each other, the description will be herein given solely to the right wheel cylinder 10.

Now, as shown in FIG. 1, the brake actuator 10 has a generally cylindrical housing 11 having provided in its wall an inlet 12 and outlet 13. The inlet 12 communicates with the master cylinder 2 through a conduit 14 and the outlet 13 communicates with the right wheel cylinder 4 through a conduit 15. A plunger 16 is axially movably mounted in the housing 11 and extends outwardly through the sidewall opposite to the outlet 13. Oil seals 17 and 18 may be provided between the housing 11 and plunger 16 to prevent a leak of fluid out of the housing. The housing 11 also has axially slidably accommodated therein a piston 19 which is connected to the inner end of the plunger 16 through a ball valve plunger 20. An oil seal (not identified) may be provided between the housing 11 and piston 19. The piston, in turn, has accommodated therein a ball 21 and spring 22 forcing the ball 21 against the leading end of the ball valve plunger 20. The movement of the ball valve plunger 20 away from the piston 19 is restricted by a stop or snap ring 23 anchored to the inner wall of the housing 11. Between the piston 19 and the sidewall of the housing 11 with the outlet 13 is mounted a return spring 24 which acts to force the piston 19 toward the plunger 16.

The plunger 16 is moved by the action of a diaphragm assembly 25. The diaphragm assembly 25 has vacuum and atmospheric chambers 26 and 27, respectively. The chambers 26 and 27 are isolated from each other by a diaphragm member 28. The diaphragm member 28 is connected to the leading end of the plunger 16. A spring 29 is mounted in the vacuum chamber 26 to force the diaphragm member 28 away from the casing 11. The vacuum chamber 26 communicates via a conduit 30 with the intake manifold 5 of the engine (not shown) downstream of the throttle valve 6. Designated at 31 is a one-way check valve provided in the conduit 30 to prevent the vacuum in the chamber 26 from being drawn back into the intake manifold 5 when the vacuum in the intake manifold decreases to a predetermined level.

The vacuum and atmospheric chambers 26 and 27, respectively, communicate with a solenoid valve assembly 32 through conduits 33 and 34, respectively.

The solenoid valve assembly 32 has provided therein vacuum and atmospheric chambers 35 and 36, respectively, isolated from each other by a partition wall 37 with a through hole (not identified) formed therein. The vacuum chamber 35 communicates with the chambers 26 and 27 of the diaphragm assembly 25 through the above-said conduits 33 and 34, respectively. The solenoid valve assembly has, as customary, a valve member 38 mounted in the vacuum chamber 35, spring 39 mounted in the chamber 35 and forcing the valve member 38 against the partition wall 37, plunger 40 extending through the atmospheric chamber 36 and abutting to the valve member 38 through the hole in the partition wall 37, and solenoid coil 41 operating the plunger 40 when excited.

The atmospheric chamber 36, on the other hand communicates with an air intake chamber 42. The air intake chamber 42 has accommodated therein a valve member 43 and spring 44 and is opened to the air through an inlet 45. If preferred, the inlet 45 may be opened to the air through a conduit 46 and air intake chamber 47.

When, in operation, the brake pedal 1 is depressed, then the pressurized fluid in the master cylinder 2 is passed over to the right wheel cylinder 4 to apply brake to the right driving wheel (not shown).

The solenoid coil 41 is excited by the spin detector (which is later to be described) only when the difference between the speeds of the right and left driving wheels exceeds a predetermined level and is normally kept unexcited.

The solenoid valve assembly 32 thus being normally kept inoperative, the valve member 38 is forced against the partition wall 37 by the action of the spring 39, opening the inlet to the conduit 33. The conduit 33 is therefore permitted to communicate with the conduit 34 so that the vacuum and atmospheric chambers 26 and 27, respectively, communicate with each other. It follows that air drawn from the air filter 42 is allowed into the air intake chamber 47 through the conduit 46 and further into the atmospheric chamber 36 of the solenoid valve assembly 32. The hole in the partition wall 37 being closed by the valve member 38 by a spring action, the chambers 35 and 36 are prohibited to communicate with each other so that the air introduced into the atmospheric chamber 36 is not allowed into the vacuum chamber 35. In this condition, both the vacuum chamber 26 and atmospheric chamber 27 communicate with the intake manifold 5 of the engine en route the conduit 30 and one-way check valve 31. The chambers 26 and 27 are thus maintained under a high vacuum of, say, about 500 mm. of Hg.

Assume now, the right driving wheel has started spinning. Then, the spin detector will work to supply a voltage with a predetermined magnitude to the solenoid coil 41 of the solenoid valve assembly 32. The solenoid coil 41 being excited the plunger 40 protrudes forward to depress the valve member 38, which consequently is moved away from the partition wall 37 against the action of the spring 39 so as to close the inlet to the conduit 33. Thus, the air introduced from the air filter 47 forces the valve member 43 to retract against the action of the spring 46 and to open the inlet from the conduit 34. The air introduced into the air intake chamber 42 is allowed into the vacuum chamber 35 through the atmospheric chamber 36 and is thereafter allowed into the atmospheric chamber 27 of the diaphragm assembly 25 through the conduit 34. The vacuum chamber 26 being maintained at vacuum as previously mentioned, the diaphragm member 28 is forced toward the casing 11 due to the very difference between the pressures into two chambers 26 and 27. The plunger 16 and accordingly the piston 19 are forced toward the outlet 13 of the casing 11 against the action of the spring 24. Since, at this moment, the ball valve plunger 20 is forced toward the piston 16 by the action of the spring 22 through the ball valve 21, the passage extending throughout the piston 19 is closed by the ball valve 21 immediately before the plunger 16 is received at its inner end by the end wall of the ball valve plunger 20. As the diaphragm member 28 is moved still toward the casing 11, the pressurized fluid staying in the casing 11 is compressed toward the outlet 13 so that the hydraulic pressure supplied to the right wheel cylinder 4 is increased. Brake is thus applied to the right driving wheel (not shown) to stop the spinning thereof. As a consequence, a driving torque equal to the braking torque applied to the right wheel is induced in the left driving wheel.

As the difference between the speeds of the right and left driving wheels is reduced below a predetermined level, the solenoid coil 41 is deenergized to allow the valve member 38 to open the inlet to the conduit 33 by the action of the spring 39. This causes the atmospheric chamber 27 to communicate with the intake manifold 5 through the conduit 34, vacuum chamber 35 conduit 33 and conduit 30. Thus, a vacuum is drawn into the atmospheric chamber 27 so that the diaphragm member 28 and accordingly the piston 16 are forced away from the casing 11. The hydraulic pressure in the right wheel cylinder 4 is reduced to a normal level in this manner.

Figure 2:
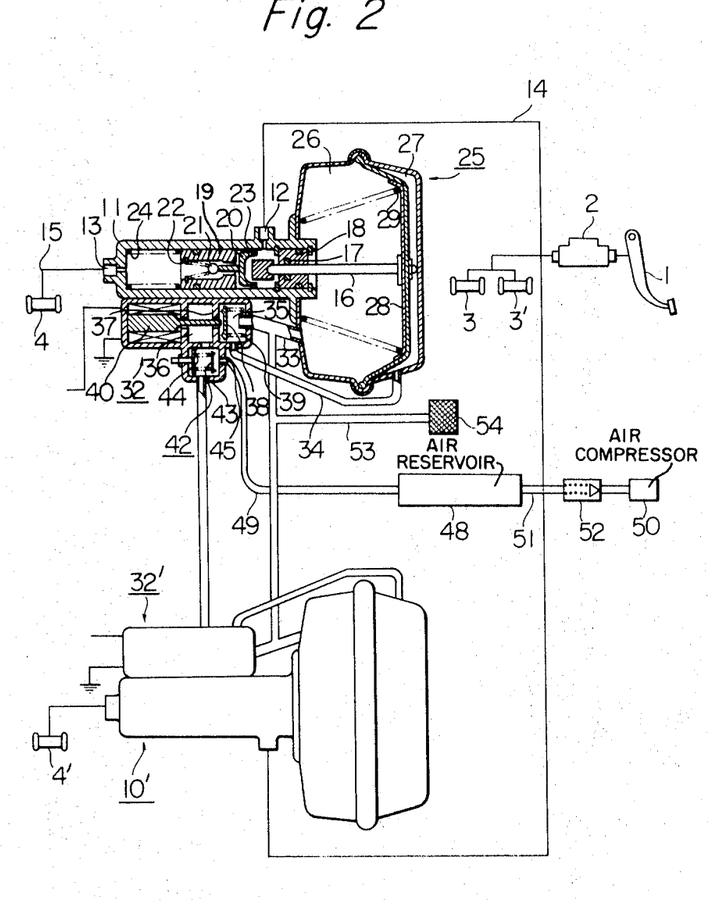
FIG. 2 is a view similar to FIG. 1 but showing a modification of the brake actuator shown therein.

In a motor vehicle having an air compressor, compressed air may be utilized, if desired, in lieu of the vacuum as a source of effort to drive the diaphragm member, an example being illustrated in FIG. 2.

The brake actuator, diaphragm assembly and solenoid valve assembly as shown in FIG. 2 are all similar in construction and operation to the counterparts shown in FIG. 1 and, therefore, like reference numerals are assigned to the corresponding elements. The nomenclature of the vacuum chambers 26 and 35 and atmospheric chambers 27 and 36 as adopted with reference to FIG. 1, however, should not apply to the chambers 26 and 35 and chambers 27 and 36 appearing in FIG. 2.

Different from the construction arrangements shown in FIG. 1, the air intake chamber 42 in FIG. 2 communicates with an air reservoir 48 by way of a conduit 49. This air reservoir 48, in turn, communicates with an air compressor 50 via a conduit 51 and one-way check valve 52 (which is directed in a direction reverse to the check valve 31). Also different from the example of FIG. 2, the conduit 33 connecting the chambers 26 and 35 of the diaphragm assembly 25 and solenoid valve assembly 32, respectively, is opened to the air preferably through a conduit 53 and 54.

In operation, when the solenoid coil 37 is kept unexcited, atmospheric air is introduced into the chambers 26 and 27 of the diaphragm assembly because the valve member 38 is held in a position to open the outlet to the conduit 33 by the action of the spring 39. The diaphragm member 28 and accordingly the piston 16 are kept in positions remotest from the piston 19 with the result that the hydraulic pressure in the right-wheel cylinder 4 is maintained at a normal level.

If, however, the right driving wheel (not shown) starts to spin, the solenoid coil 41 of the solenoid valve assembly 32 is excited to cause the valve member 38 to open the hole in the partition wall 37. As the consequence, air supplied under pressure from the air reservoir 48 is allowed into the air intake chamber 42 against the action of the spring 44 and is thereafter passed to the chamber 27 of the diaphragm assembly 25 through the chambers 36 and 35 and conduit 34. This causes the diaphragm member 28 to move toward the casing 11 complete with the plunger 16 and eventually the wheel cylinder 4 to actuate the brake to stop the spinning of the wheel, as previously discussed.

As the solenoid coil 41 is deenergized, the valve 43 moves to close the inlet from the conduit 49 and air in tee chamber 27 is released to the air through the conduits 33 and 53 and air filter 54. As a result, the diaphragm member 28 is forced to resume its original position by the action of the spring 29, restoring the normal condition of the wheel cylinder 4.

Figure 3A:
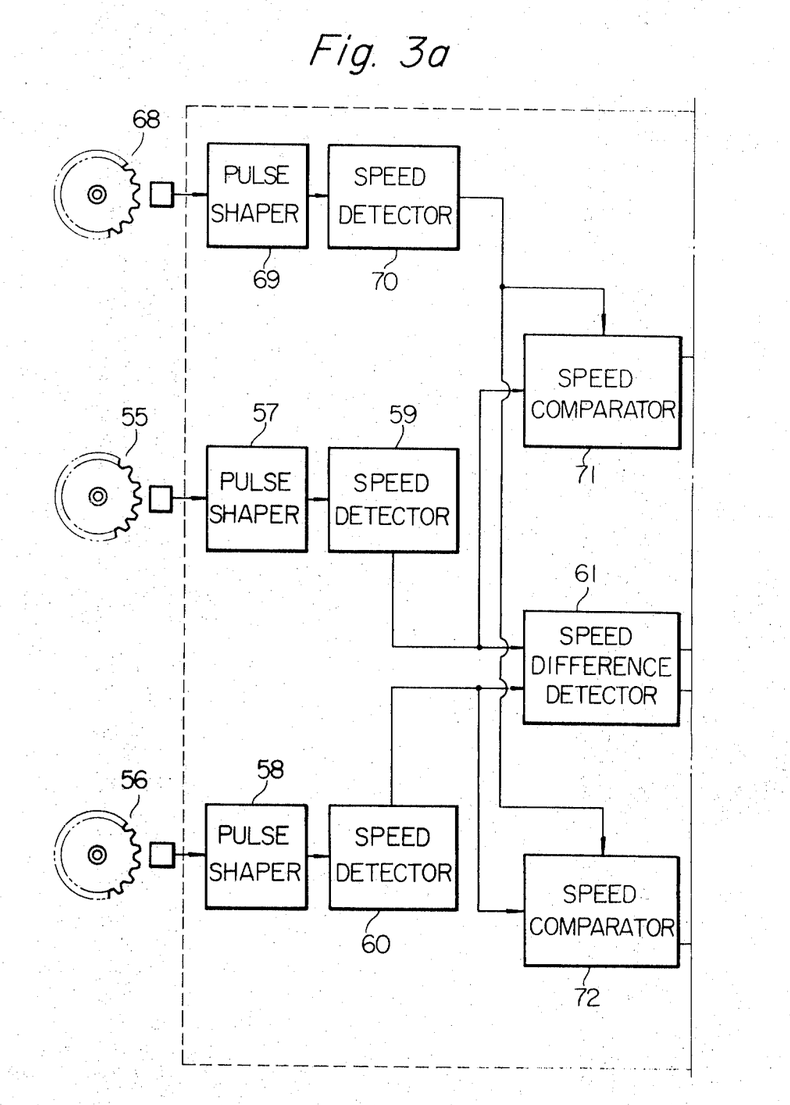
FIG. 3a and 3b are block diagrams of electrical arrangements of the spin detector of the antispin device according to the invention.
Figure 3B:
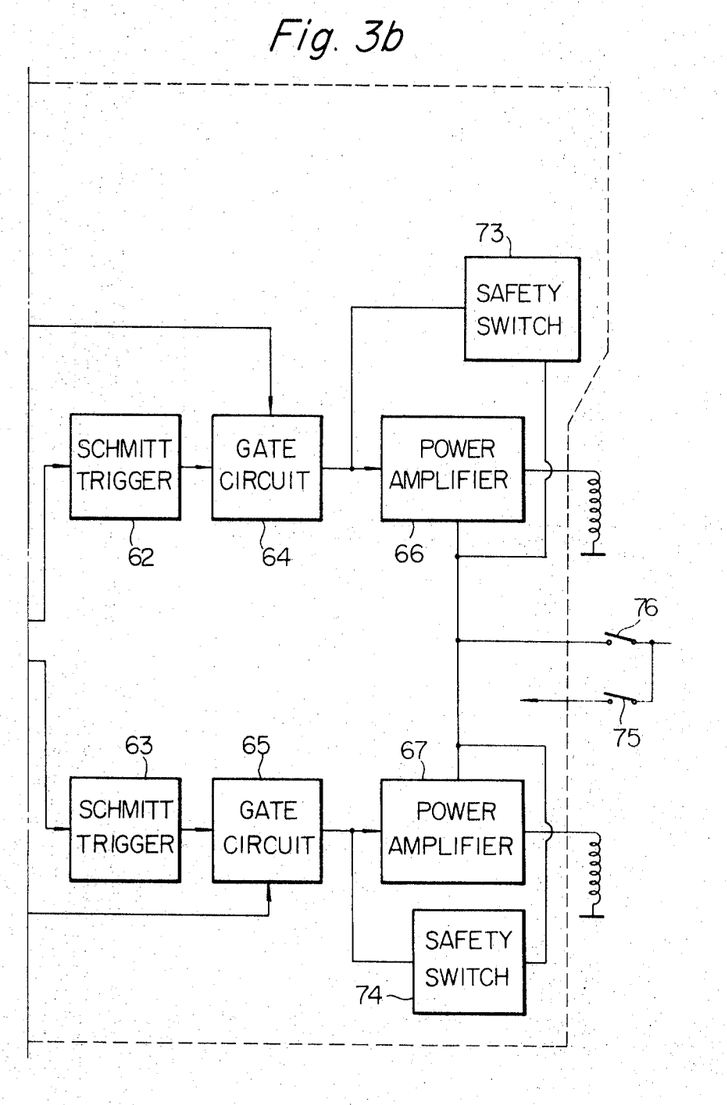

The electrical arrangements of the spin detector to govern the operation of the mechanism shown in FIGS. 1 and 2 are illustrated in FIGS. 3a and 3b.

Referring to FIGS. 3a and 3b, the speeds of the right and left driving wheels (not shown) are at all times monitored by sensors 55 and 56 which may actually be transducers mounted on the right and left rear wheels or axles, respectively. The driving speeds of the wheels thus obtained are converted into corresponding electric pulses by the sensors 55 and 56, which pulses are then supplied to the circuit enclosed in dotted lines.

More specifically, the output pulses issued from the sensors 55 and 56 are supplied to pulse shapers 56 and 58, respectively, at which the pulses are given predetermined pulse widths. The pulse shapers 57 and 58 are connected to speed detectors 59 and 60, respectively, at which the pulses delivered from the pulse shapers 57 and 58, respectively, are integrated into voltages corresponding to the respective speeds. The speed detectors 59 and 60 are connected with a speed difference detector 61 which, when a difference, if any, in the voltages supplied from the speed detectors 59 and 60 increases in excess of a predetermined reference voltage, delivers an output voltage. The speed difference detector 61 is connected to two Schmitt triggers 62 and 63 which, in turn, are connected with lines associated with the right and left brake actuators 10 and 10 , respectively. Thus, the output voltage from the speed difference detector 61 is selectively fed to either of the Schmitt triggers 62 and 63 which is associated with one driving wheel rotating at higher speed than the other driving wheel. The Schmitt trigger 62 or 63 delivers an output voltage once the input voltage impressed thereon exceeds a predetermined level. The Schmitt triggers 62 and 63 are connected to gate circuits 64 and 65, respectively. The gate circuits 64 and 65, in turn, are connected with power amplifiers 66 and 67, respectively, for amplifying the output voltage from either of the gate circuits 64 and 65, respectively. These amplifiers 64 and 65 are connected to the solenoid coils of the solenoid valve assemblies for the right and left wheel cylinders 4 and 4 , respectively (FIGS. 1 and 2).

When, in operation, the vehicle is running with the rear driving wheels rotating in normal conditions, the speeds detected at the sensors 55 and 56 are approximately equal to each other and the speed detectors 59 and 60 deliver output voltages of substantially the same levels. No output voltage, therefore, appears from the speed difference detector 61 so that the line subsequent to the speed difference detector 61 remain deenergized. The solenoid valve assemblies (FIGS. 1 and 2) are thus kept inoperative.

If, however, the right driving wheel for instance rotates at a higher speed than the left driving wheel, then the output voltage delivered from the speed detector 59 exceeds the voltage from the speed detector 60 to cause the speed difference detector 61 to deliver an output voltage to the Schmitt trigger 62. As soon as the input voltage applied to the Schmitt trigger 62, a voltage is delivered to the power amplifier 66 through the gate circuit 64, energizing the solenoid coil 41 of the solenoid valve assembly 32. See FIGS. 1 and 2. The right wheel cylinder 4 is thus actuated as a result of the motions of the solenoid valve assembly 32, diaphragm assembly 25 and brake actuating device 10 in a manner previously discussed. The spinning of the right driving wheel is stopped in this manner immediately after that wheel has started spinning.

If, in the spin detector thus constructed, a failure or break of wire takes place in the sensors 55 and 56, either of the output voltages from the speed detectors 59 and 60 will become higher than the other, eventually causing the solenoid assembly 32 or 32 to be actuated unnecessarily. In order to avoid such an inconvenience, failureproof means may be provided in the spin detector, if preferred.

For this purpose, an additional sensor (or transducer) 68 is provided to monitor the revolution speed of either of the front wheels (not shown). The sensor 68 is connected to a pulse shaper 69 whereby the pulses supplied from the sensor 68 are shaped to have a predetermined pulse width. The thus shaped pulses are introduced into a speed detector 70 connected with the pulse shaper 69 to deliver a voltage proportional to the speed of the front wheel detected at the sensor 68. The speed detector 70 is connected to wheel speed comparators 71 and 72 which, in turn, are connected with the speed detectors 59 and 60, respectively, for the right and left rear wheels. The comparators 71 and 72 compare the voltages proportional to the right and left rear wheel speeds supplied from the speed detectors 59 and 60, respectively, with the voltage proportional to the front wheel speed supplied from the speed detector 70. If there is present a difference between the voltages supplied from the speed detectors 59 and 70 or between the voltages from the speed detectors 60 and 70, then an output voltage is delivered from the comparator 71 or 72. The comparators 71 and 72 are connected to the gate circuits 64 and 65 which are previously mentioned.

It is, in this instance, to be noted that the sensor 68 should be mounted on either of the front, nondriving wheels (not shown) because the sensor 68 is required to detect and supply a voltage proportional to the absolute vehicle speed which is practically independent from the speed of the engine.

If, in operation, a failure takes place between the sensor 56 and speed detector 60 connected with the left wheel speed sensor 56, then there may appear no voltage at the output of the speed detector 60. In this condition, the voltage (proportional to the vehicle speed) supplied from the speed detector 70 with the voltage (proportional to the right wheel speed) from the speed detector 59. When these voltages are substantially equal to each other, then the gate circuit 64 is closed to keep the solenoid valve assembly 32 inoperative.

If, on the contrary, a failure is invited between the sensor 55 and speed detector 59, the gate circuit 65 is closed to keep the solenoid valve assembly 32 inoperative in a similar manner.

Thus, it will be understood that the spin detector thus having the failureproof means operates in a manner to actuate the solenoid assemblies 32 and 32 if, and only if, the front wheel is outsped by the rear wheels and if there is present a predetermined difference between the right and left rear wheel speeds.

When, moreover, the power amplifier 66 or 67 happens to fail to leave the solenoid assembly 32 or 32 actuated, increased hydraulic pressure will be constantly applied to the right or left wheel cylinder 4 or 4 respectively. To avoid such an inconvenience, safety switches 73 and 74 may be connected to the power amplifiers 66 and 67 to cut off the current into the amplifiers in such an occasion.

The elements except for the amplifiers 66 and 67 are all powered through an ignition switch 75 with a voltage regulated with a voltage of about 10 volts by a separately mounted voltage regulator (not shown) preferably. The amplifiers 66 and 67 may be, on the other hand, powered through an accelerator switch 76 coordinating with the accelerator pedal (not shown). The switch 76 may be so arranged as to be actuated only when the accelerator pedal is depressed to a predetermined depth.

The electrical arrangements of the spin detector as already described and shown may be applied to any antispin device of a motor vehicle but, especially where the construction arrangements of the brake actuator shown in FIG. 2 are to be utilized, they may preferably be used in combination with a pneumatic braking system of known type. Such an example is illustrated in FIG. 4.

Figure 4:
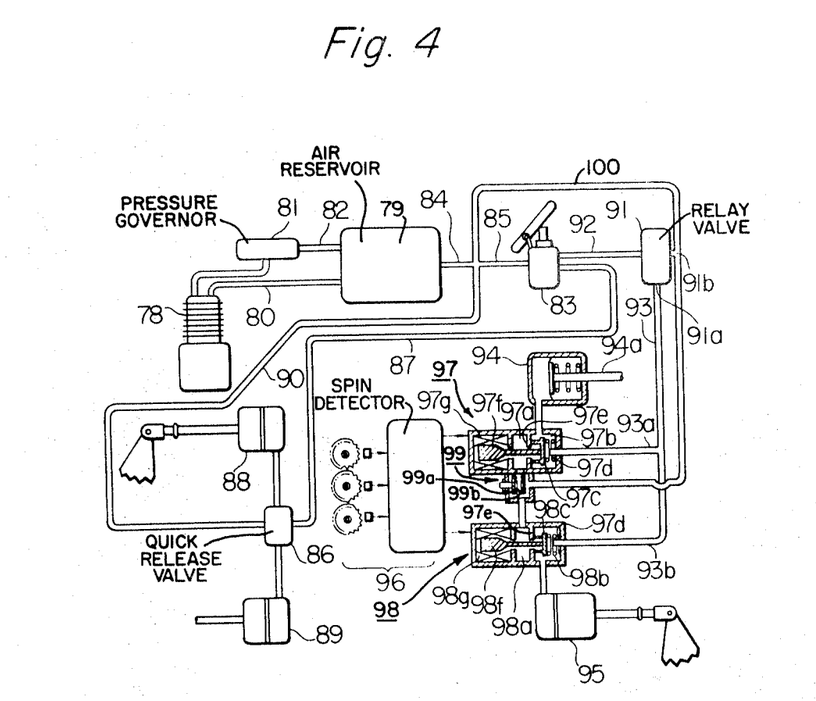
FIG. 4 is a schematic view of an overall construction of a pneumatic braking system incorporating the antispin device of the invention.

Referring to FIG. 4, the pneumatic braking system uses as a driving source an air compressor 78 of a suitable capacity. The air compressed by the air compressor 78 is drawn to an air reservoir 79 through a conduit 80. The pressure in the air reservoir 79 is regulated by a pressure governor 81 communicating therewith through a conduit 82. The air reservoir 79 communicates with a brake valve 83 through conduits 84 and 85. The brake valve 83 has two outlet ports one of which communicates with a quick release valve 86 through a conduit 87. The compressed air in the quick release valve 86 is led to right and left front brake chambers 88 and 89, which operate the right and left front brakes (not shown), respectively. The quick release valve 86 directly communicates with the air reservoir 79 through a conduit 90 so that compressed air under constant pressure is led to the quick release valve 86.

The other outlet port of the brake valve 83 communicates with a relay valve 91 through a conduit 92. A conduit 93 leads from the outlet port 91a of the relay valve 91, which conduit 93 is branched into two conduits 93a and 93b. The conduits 93a and 93b communicate with right and left rear brake chambers 94 and 95, respectively, to actuate the right and left rear brakes (not shown). The antispin device implementing the invention is combined with the pneumatic braking system thus constructed and arranged.

The antispin device is, as shown, largely comprised by a spin detector which is generally represented by 96 and two pressure control vales 97 and 98. The pressure control valve 97 and 98 have first chambers 97a and 98a and second chambers 97b and 98b, respectively. The first chambers 97a and 98a communicate with each other through a pressure governor 99, while the second chambers 97b and 98b communicate on the one hand with the right and left rear brake chambers 94 and 95, respectively, and on the other with the conduit 93 through the conduits 93a and 93b, respectively. The pressure control valves 97 and 98 have provided therein valve members 97c and 98c forced against partition walls 97e and 98e between the first and second chambers by springs 97d and 98d. Through holes are formed in these partition walls 97e and 98e through which plungers 97f and 98f extend toward the valve members 97c and 98c, respectively. These plungers 97f and 98f are moved by solenoid coils 97g and 98g, respectively, which the electrically connected with the circuit connections of the spin detector which is generally indicated by 96. The pressure governor 99 has provided therein a valve member 99a forced by the action of a spring 99b toward the inlet of the chamber in the governor to regulate the pressure of the compressed air to be introduced into the brake chamber 94 or 95 from a conduit 100. The chamber of the governor 99 communicates through the conduit 100 with the conduit 84 leading from the air reservoir 79. The conduit 100 communicates with the inlet port 91b of the relay valve 91.

When, in operation, the brake pedal (not shown) is pressed while the vehicle is running in normal conditions, then the brake valve 83 is opened to an extent corresponding to the depth to which the brake pedal is depressed. It therefore follows that the compressed air stored in the air reservoir 79 is passed through the brake valve 83 over to the quick release valve 86 and to the relay valve 91. Thus, air under pressure proportional to the depth to which the brake pedal is depressed is passed over to the brake chambers 88 and 89 through the quick release valve 86 and to the brake chambers 94 and 95 through the relay valve 91. The front and rear brakes are in this manner applied.

If, however, a difference is detected between the speeds of the right and left driving wheels by the spin detector 96, then the spin detector acts to supply a voltage to either of the solenoid coils 97g and 98g. Assuming, for instance, the solenoid coil 97g is energized, the plunger 97f protrudes forwardly to cause the valve member 97c leave the partition wall 87e. As a result the first chamber 97a is permitted to communicate with the second chamber 97b and the inlet from the conduit 93a is closed by the valve member 97c. The compressed air introduced into the first chamber 97c is thus allowed into the brake chamber 94 through the second chamber 97b. The plunger which is designated at 94a is then moved to apply a brake to the right rear wheel. A driving torque corresponding to the braking torque applied to the right wheel is consequently carried to the left rear wheel.

Now, it should be understood, that although the antispin device according to the invention has hereinbefore described and shown to be mounted on a rear driven motor vehicle, the same may be applied to a motor vehicle driven by the front wheels.

What is claimed is:

1. An antispin device in combination with a braking system of a motor vehicle having a brake pedal, master cylinder operatively connected to the brake pedal and delivering a hydraulic pressure, and right and left wheel cylinders for actuating the brakes for the right and left driving wheels, respectively, with the hydraulic pressure supplied from the master cylinder, which device comprises spin detector means detecting a difference in the speeds of the right and left driving wheels and delivering a voltage as soon as the difference in the speeds exceeds a predetermined level, and means connected between the master cylinder and right and left wheel cylinders for passing said hydraulic pressure over to said wheel cylinders responsive to said voltage when applied thereto said spin detector means comprises a pair of sensors mounted on the right and left driving wheels for detecting the revolution speeds thereof and delivering pulses representing the said speeds, a pair of pulse shapers respectively connected to said sensors for determining the pulse widths of said pulses, a pair of speed detectors respectively connected to said pulse shapers for delivering voltages proportional to the respective speeds of the driving wheels in accordance with the pulses supplied from said pulse shapers, a speed difference detector connected to said speed detectors for delivering a voltage as it detects a difference between the voltages supplied from said speed detectors, a pair of Schmitt triggers connected to said speed difference detector and respectively associated with the right and left wheel cylinders, the voltage from said speed difference detector being selectively applied to either of said Schmitt triggers which is associated with one driving wheel rotating at a higher speed than the other, either of the Schmitt triggers thus delivering an output voltage as soon as the voltage supplied from said speed difference detector exceeds a predetermined level, a pair of gate circuits respectively connected to said Schmitt circuits for delivering output voltages when energized, and a pair of power amplifiers respectively connected to said gate circuits for amplifying the output voltages supplied from said gate circuits.

2. A device according to claim 1, wherein said spin detector means further comprises an additional sensor mounted on either of the free wheels of the vehicle for detecting the revolution speed of the free wheel and delivering pulses representing the speed, a pulse shaper connected to said additional sensor for determining the pulse widths of said pulses, a free wheel speed detector connected to said pulse shaper for delivering a voltage proportional to the speed of the free wheel in accordance with the pulses supplied from said pulse shaper, a pair of speed comparators connected to said free wheel speed detector and said pair of speed detectors, said comparators being respectively connected at their outputs to said gate circuits, whereby, when an output voltage is absent at the output of either of said pair of speed detectors, the output voltage from said free wheel speed detector is compared with the output voltage from the other of said pair of speed detectors by either of said speed comparators for delivering an output voltage to either of said speed comparators for delivering an output voltage to either of said gate circuits.

3. A device according to claim 1, wherein said spin detector means is powered through an ignition switch except for said power amplifiers which are powered through an accelerator pedal switch coordinating with the accelerator pedal.

4. A device according to claim 3, wherein a pair of safety switches are respectively connected across said power amplifiers for disconnecting said power amplifiers from the power supply when a failure is invited therein.

5. A device according to claim 1, wherein the second named means comprises right and left brake actuators communicating with the master cylinder and right and left wheel cylinders, respectively, and each provided with a piston for regulating the hydraulic pressure to the be passed through the brake actuator, a pair of diaphragm assemblies each having a diaphragm member for controlling the movement of said piston, and a pair of solenoid valve assemblies responsive to said voltage supplied from said spin detector means for controlling the movement of said diaphragm member.

6. A device according to claim 5, wherein each of said brake actuators further comprises a generally cylindrical housing having provided in its wall an inlet communicating with the master cylinder and an outlet communicating with either of said wheel cylinders, said housing accommodating axially slidable therein said piston, a plunger axially movably mounted in said housing and extending outwardly through a sidewall of said housing opposite to said outlet, said plunger being rigidly secured at its outer end with said diaphragm member, a ball valve plunger axially slidably mounted said housing and connected at one end with said piston through a passage extending throughout the piston and connected releasably at the other with the first named plunger, a ball valve mounted in said passage of said piston, a spring mounted in said passage and forcing said ball against the inner end of said ball valve plunger, and a return spring mounted in said housing and behind said piston for forcing the piston away from said outlet.

7. A device according to claim 5, wherein each of said diaphragm assemblies further comprises first and second chambers isolated by said diaphragm member and a spring mounted in said first chamber for forcing said diaphragm member into a position to hold said plunger in a position remote from said outlet and wherein each of said solenoid valve assemblies comprises first and second chambers isolated from each other by a partition wall with a through hole formed therein, said first chamber communicating with said first and second chambers of said diaphragm assembly through first and second ports; a valve member mounted in said first chamber of said solenoid valve assembly; a spring mounted in said first chamber of said solenoid assembly and forcing said valve member against said partition wall to normally close said through hole; an air intake chamber communicating with said second chamber of said solenoid valve assembly and opened to the air through an air port, said air intake chamber having mounted therein a valve member forced by a spring away from said air port; a plunger movably extending through said second chamber of said solenoid valve assembly; and a solenoid coil actuating just said plunger.

8. A device according to claim 7, wherein said first chambers of said diaphragm assembly and said solenoid valve assembly communicates with the intake manifold of the engine.

9. A device according to claim 8, wherein said first chambers communicate with the intake manifold through a one-way check valve.

10. A device according to claim 7, wherein said air intake chamber is opened to the air through an air filter.

11. A device according to claim 7, wherein said air intake chamber communicates with an air reservoir to which air under pressure is supplied from an air compressor and wherein said first chambers of said diaphragm assembly and said solenoid valve assembly are opened to the atmosphere.

12. A device according to claim 11, wherein a one-way check valve is provided between said air reservoir and air compressor.

13. an antispin device in combination with a pneumatic braking system of a motor vehicle having an air compressor, an air reservoir communicating with the air compressor to store therein compressed air supplied from the air compressor, a brake valve communicating at its inlet port with the air reservoir, and a relay valve communicating at its inlet port with the brake valve and at its one outlet port with the right and left brake chambers of the right and left driving wheels, respectively, for passing the compressed air in the air reservoir over to the brake chambers when the brake valve is opened, which device comprises spin detector means detecting a difference between the speeds of the right and left driving wheels and delivering a voltage as soon as the difference in said speeds exceeds a predetermined level and means responsive to said voltage to pass the compressed air in the air reservoir selectively to either of the right and left brake chambers as soon as said voltage is applied thereto, the second named means comprises a pair of pressure control valves each having a first and second chambers isolated from each other by a partition wall with a through hole formed therein, a valve member mounted in said second chamber, a spring mounted in said second chamber to force said valve member against said partition wall for normally keeping said through hole closed, a plunger movably extending through said first chamber, and a solenoid coil connected to said spin detector means for actuating said plunger responsive to said voltage, the first chambers of said pair of pressure control valves communicating with each other through a pressure governor and the second chambers of said pair of pressure control valves communicating at their inlet ports with said relay valve and at their outlet ports with said right and left brake chambers, said pressure governor communicating at its inlet port with said air reservoir and with the other inlet port of said relay valve and having a valve member normally forced toward said inlet of said pressure governor.

* * * * *